(12) United States Patent
Wennesheimer et al.

(10) Patent No.: US 10,313,907 B2
(45) Date of Patent: Jun. 4, 2019

(54) METHOD FOR DETERMINING A DATA TRANSFER RATE OF A TELECOMMUNICATIONS NETWORK

(71) Applicant: P3 Insight GmbH, Aachen (DE)

(72) Inventors: Michael Wennesheimer, Willich (DE); Ralf Klueber, Meerbusch (DE)

(73) Assignee: P3 Insight GmbH, Aachen (DE)

( * ) Notice: Subject to any disclaimer, the term of this patent is extended or adjusted under 35 U.S.C. 154(b) by 120 days.

(21) Appl. No.: 15/371,690

(22) Filed: Dec. 7, 2016

(65) Prior Publication Data

US 2017/0171770 A1 Jun. 15, 2017

(30) Foreign Application Priority Data

Dec. 10, 2015 (DE) .......................... 10 2015 121 484

(51) Int. Cl.
| | |
|---|---|
| *H04W 24/00* | (2009.01) |
| *H04W 24/10* | (2009.01) |
| *H04W 24/06* | (2009.01) |
| *H04L 1/20* | (2006.01) |
| *H04L 1/00* | (2006.01) |

(52) U.S. Cl.
CPC .............. *H04W 24/10* (2013.01); *H04L 1/20* (2013.01); *H04W 24/06* (2013.01); *H04L 1/0026* (2013.01)

(58) Field of Classification Search
CPC .. H04W 24/00; H04W 24/08; H04B 17/0042; H04L 47/10; H04L 12/5602; H04L 2012/5636; H04L 47/2441; H04Q 11/0478

USPC .................. 455/423, 452.2, 512–513, 67.11; 370/231–235, 252–25
See application file for complete search history.

(56) References Cited

U.S. PATENT DOCUMENTS

| | | | |
|---|---|---|---|
| 8,838,093 B2 | 9/2014 | Haga et al. | |
| 2003/0134631 A1 | 7/2003 | Snyder et al. | |
| 2005/0277422 A1* | 12/2005 | Baker | ................... H04L 1/0026 455/450 |
| 2006/0198359 A1 | 9/2006 | Fok et al. | |
| 2007/0105544 A1 | 5/2007 | Veres et al. | |

(Continued)

OTHER PUBLICATIONS

Search Report issued in related German Application No. 16202799. 99 dated May 9, 2017 by the European Patent Office.

(Continued)

*Primary Examiner* — Dai Phuong
(74) *Attorney, Agent, or Firm* — Woodard, Emhardt, Henry, Reeves & Wagner, LLP (57) ABSTRACT

Disclosed is a method for determining a data transfer speed of a telecommunications network including a mobile terminal and a server, the method including: starting a measurement application; starting a user application that transfers data between the terminal and the network; ascertaining a measurement sequence including multiple measured values of the data transfer produced by the user application; transferring the sequence to the server; starting analysis software; determining a data block with a continuous data transfer rate greater than 0 kbit/s and a subsequent data transfer rate that is less than the continuous data transfer rate for at least 2 seconds after the data block; and determining from the data block a period of time for the transfer of a defined data volume and/or a data volume to be transferred in a defined period of time as data transfer speed of the telecommunications network.

17 Claims, 4 Drawing Sheets

(56) References Cited

U.S. PATENT DOCUMENTS

| | | | |
|---|---|---|---|
| 2007/0207800 A1 | 9/2007 | Daley et al. | |
| 2007/0243881 A1 | 10/2007 | Roskowskl | |
| 2009/0061782 A1* | 3/2009 | Olgaard | H04B 17/21 455/67.14 |
| 2009/0143020 A1* | 6/2009 | Kotabe | H04L 41/5067 455/67.11 |
| 2010/0198459 A1* | 8/2010 | Kosai | H04W 52/267 701/36 |
| 2011/0143698 A1* | 6/2011 | Shiotsuki | H01Q 3/26 455/115.1 |
| 2011/0201364 A1 | 8/2011 | Capuozzo et al. | |
| 2012/0057511 A1* | 3/2012 | Sivakumar | H04W 28/06 370/310 |
| 2012/0088457 A1 | 4/2012 | Johansson et al. | |
| 2012/0214504 A1 | 8/2012 | Zha et al. | |
| 2012/0317266 A1 | 12/2012 | Abbott | |
| 2013/0017779 A1* | 1/2013 | Song | H04W 76/45 455/39 |
| 2013/0084809 A1 | 4/2013 | Johansson | |
| 2014/0003237 A1* | 1/2014 | Kenney | H04W 28/10 370/235 |
| 2014/0087716 A1 | 3/2014 | Vaderna et al. | |
| 2014/0241177 A1* | 8/2014 | Wang | H04W 24/02 370/252 |
| 2014/0317234 A1* | 10/2014 | Mueller | H04L 47/10 709/217 |
| 2015/0081758 A1 | 3/2015 | Lee et al. | |
| 2015/0350046 A1* | 12/2015 | Thapliya | H04L 43/0852 709/224 |

OTHER PUBLICATIONS

Ho, et al.; Throughput and Buffer Analysis for GSM General Packet Radio Services (GPRS), Nortel Networks, pp. 1427-1431, 1999.

* cited by examiner

METHOD FOR DETERMINING A DATA TRANSFER RATE OF A TELECOMMUNICATIONS NETWORK

CROSS-REFERENCE TO RELATED APPLICATIONS

This application claims priority to German Patent Application No. 10 2015 121 484.9 filed Dec. 10, 2015, which is incorporated by reference.

BACKGROUND

The invention relates to a method for determining a data transfer speed of a telecommunications network, comprising at least one mobile terminal and a server, said method having the following steps: installing and starting a measurement application on the terminal, installing and starting a user application on the terminal, which during operation transfers data between the terminal and the telecommunications network, and ascertaining a measurement sequence comprising a plurality of individual measured values of a course over time of the data transfer produced by the user application.

For quality assurance and optimisation of telecommunications networks, it is known from the prior art to repeatedly establish voice and/or data links from a terminal to various destinations in order to then draw conclusions with regard to the quality of the used telecommunications network, for example on the basis of the measured call setup time or speed of an Internet connection. In order to make the measurements as realistic as possible, terminals that can be acquired by the end user, for example mobile telephones, are used.

In order to determine the quality of a mobile communication network, what are known as "drive tests" have been carried out for some years now, using measuring vehicles, wherein repeated measurements are taken along a predefined journey route. A plurality of mobile telephones are arranged in the measuring vehicle and are provided with external antennas arranged outside the measuring vehicle in order to create the most comparable conditions possible for different network operators. Such antennas are installed for example in a roof box of the measuring vehicle and are connected to the mobile telephone by means of a coaxial cable. A computer-based control unit provided in the measuring vehicle allows the mobile telephones to repeatedly establish voice and/or data links and records the quality of the used mobile communication network.

Although "drive tests" of this type have become firmly established on account of the high-quality measurement results, the effort associated therewith is not small. Measurements can only be taken when the specific measuring vehicles are set up, and in addition the measurements also can be taken only on roads. Although mobile measuring units that comprise a computer-based control unit and a plurality of mobile telephones do exist, for example in order to take measurements in trains, these measurements also can be taken only when the mobile measuring units are operated by dedicated testers.

SUMMARY

Proceeding from this situation, the object of the invention is to provide a possibility for determining the quality of a telecommunications network in a much simpler and more flexible way.

The object is achieved by the features in the independent claim. Advantageous embodiments are specified in the dependent claims.

The object is therefore solved by a method for determining a data transfer speed of a telecommunications network, comprising at least one mobile terminal and a server, said method having the following steps:
  a) installing and starting a measurement application on the terminal in order to carry out at least steps c) and e),
  b) installing and starting a user application on the terminal, which during operation transfers data between the terminal and the telecommunications network,
  c) ascertaining a measurement sequence comprising a plurality of individual measured values of a course over time of the data transfer produced by the user application,
  e) transferring the measurement sequence to the server by means of the terminal,
  f) installing and starting an analysis software on the server in order to carry out at least steps g) and i),
  g) ascertaining from the measurement sequence at least one data block comprising at least one detected measured value by means of the analysis software in such a way that the data block has a continuous data transfer rate >0 kbit/s and a subsequent data transfer rate lies below the continuous data transfer rate for period of time ≥2 seconds after the data block, and
  i) ascertaining from the data block a period of time for the transfer of a defined data volume and/or a data volume to be transferred in a defined period of time as data transfer speed of the telecommunications network by means of the analysis software.

The invention therefore follows a completely new path in that, in order to determine the data transfer speed and thus quality of the telecommunications network, neither a measuring vehicle nor a mobile measuring unit are required. Instead, by way of example, a conventional smartphone can be used as terminal, whereby the method can be carried out in a simple way. The measurement application is installed on the smartphone, by means of which application data transfer speed of the telecommunications network can be determined during regular use of the user application also installed on the smartphone. In this respect, the proposed method allows the determination of the data transfer speed of a telecommunications network even independently of whether a measuring vehicle or a mobile measuring unit is currently in operation and also away from roads on which the measuring vehicle can travel.

If, in a preferred embodiment, a plurality of terminals having respective measurement applications are provided, a large number of measurement sequences can be detected at different locations, such that the data transfer speed of the telecommunications network can be determined much more comprehensively and with better quality. The method in this way enables "crowd-sourcing", whereby the quality of a telecommunications network can be determined much more economically. The method particularly advantageously does not require any manual interaction on the part of a user and can be performed on the terminal in the background in automated manner, at least with regard to step c).

In contrast to "speed test" methods known from the prior art, in which artificial test data is transferred between the terminal and the telecommunications network in order to determine the data transfer speed, the proposed method is also characterised in that there is no need to generate any test data of this type. Accordingly, there are also no additional costs incurred by the method for the transfer of the otherwise necessary test data. What is also advantageous is that user behaviour has no influence on the execution of the method. Since the valorisation of the measurement sequence in steps g) and i) occurs on the server, the measurement application on the terminal requires only very little CPU computing power. As a result, measured values of the course over time of the data transfer produced by the user application, from which the data transfer speed of the telecommunications network can be determined, can be detected in a particularly simpler way by means of the proposed method.

The measurement can be installed on the terminal preferably from what is known as an "app store" by being downloaded from the Internet or from a memory card. The user application can be, for example, a web browser, a messaging application, such as WhatsApp or Skype, a video player, or an e-mail program, which during operation transfers data between the terminal and the telecommunications network. In step c), a measured value is detected preferably at periodic intervals, for example every 0.5, 1, 2, 5, 10, 30 or 60 seconds, and characterises a data throughput, i.e. only pure use data, or a data transfer rate, i.e. inclusive of any control data, between the terminal and the telecommunications network. The measured value can represent a download or downstream and/or an upload or upstream and is typically determined in the unit kbit/s, that is to say kbps, or Mbit/s, that is to say Mbps. The measurement sequence preferably comprises all ascertained measured values and can be stored temporarily on the terminal in a database, before in step e) the transfer to the server is performed in particular by the measurement application and wirelessly or in a wired manner and/or via Internet. The server is preferably arranged at a central location, for example in a computer centre, and connected to the Internet or the telecommunications network.

In step g) the determined measured values of the measurement sequence are separated into at least one data block or a plurality of individual data blocks. Each data block, also referred to as a "chunk" characterises a time-limited data transfer between the terminal and telecommunications network and in this way, over its temporal course, has a non-stop continuous data transfer rate between its start and finish of >0 kbit/s. Each measured value of the data block has a data transfer rate >0 kbit/s. After the end, only at least one measured value having the subsequent data transfer rate, which lies below the continuous data transfer rate, i.e. for example is 0 kbit/s, follows during a period of time ≥2 seconds. During the time period ≥2 seconds, a plurality of measured values having just 0 kbit/s for example lie between two data blocks, such that no data is transferred between terminal and telecommunications network. The data block can comprise only measured values for the download, only measured values for the upload, or both for the download and for the upload. The continuous data transfer rate is preferably >0, >5, >10 or >15 kbit/s, and accordingly the subsequent data transfer rate is preferably 0, ≤5, ≤10 or 15≤kBits/s respectively.

Lastly, in step i), the periods of time for the transfer of the defined data volume and/or the data volume to be transferred in the defined period of time are determined as data transfer speed of the telecommunications network by the analysis software from the data block obtained in the manner described above. With a plurality of data blocks, the determination is made preferably from the plurality of the data blocks, for example by averaging of the specific periods of time for the transfer of the defined data volume and/or the data volume to be transferred in the defined period of time:

In accordance with a preferred development, the method comprises the following step:

d) determining a terminal type by means of the measurement application, in particular from the first eight numbers of the international mobile equipment identity serial number of the terminal, and in step e) transferring the terminal type to the server by means of the terminal, and/or h) dividing the at least one data block into portions of defined length, in particular a length of 5 seconds, by means of the analysis software, and i') determining, from the portion, the period of time for the transfer of the defined data volume and/or the data volume to be transferred in the defined period of time as data transfer speed of the telecommunications network by means of the analysis software.

By determining the terminal type, a possible type-dependent maximum data transfer rate of the terminal required to carry out the method can be defined in a simple way. The terminal is particularly advantageously identified on the basis of the international mobile equipment identity, or IMEI. The IMEI is a unique 15-digit serial number, on the basis of which any GSM, UMTS and LTE terminal can be uniquely identified worldwide. By means of the analysis software, it is possible to define the maximum data transfer rate of the ascertained terminal type, for example by querying a database. The length in step h) is preferably 3, 4 or 5 seconds and/or, with the ascertainment in step i'), only the first portion of the data block is taken into consideration in each case.

In accordance with yet a further preferred embodiment, the measurement sequence is ascertained only when the user application on the terminal transfers data between the terminal and the telecommunications network, i.e. for example when a user watches an online video by means of the user application. If no data is transferred between the terminal and the telecommunications network, the measurement application can transfer into an idle state. If a plurality of user applications are provided on the terminal, the measurement sequence is preferably ascertained only when at least one user application transfers data between the terminal and the telecommunications network.

In a preferred development, a plurality of data blocks each comprising a plurality of detected measured values are determined by the analysis software from the measurement sequence. In a very particularly preferred development, the data block is ascertained by the analysis software in such a way that a subsequent data transfer rate lies below the continuous data transfer rate during a period of time ≥3 or ≥4 seconds after the data block, or there is no data transfer. The period of time can also be ≥5, 8 or 10 seconds.

In accordance with another preferred embodiment, in step c) when ascertaining the measurement sequences and/or with the ascertainment in step g), confirmation signals of the telecommunications network are exempted. Confirmation messages of this type, also referred to as acknowledgements or ACK for short, result for example from the transfer layer of telecommunications network and can occur both in the downstream and in the upstream. By removing the confirmation signals, a net data transfer speed can be ascertained.

In principle, the data block, the defined data volume, and/or the defined period of time can be of any size. In accordance with a particularly preferred embodiment, however, the data block comprises no more than 30 minutes, the defined data volume comprises 2, 3 or 4 MB, and/or the defined period of time comprises 2, 3 or 4 seconds. If, for example, the continuous data transfer rate for more than 30 minutes is >0 kbit/s, the data block is limited to a length of 30 minutes. Practical tests have shown that a much more accurate data transfer speed can be determined in this way. Values for defined data volumes of 3 or 4 MB and defined periods of time of 2, 3 or 4 seconds have also proven to be expedient in practical tests.

For the embodiment of the terminal, there are also various possibilities available. In accordance with a particularly preferred development, the terminal is embodied as a smartphone, as a mobile telephone, or as a tablet. The terminal is preferably assigned to a user, who retrieves data from the Internet by means of the user application, whereas the measurement application ascertains the course over time of the data transfer produced by the user application. In another preferred development the telecommunications network is embodied as a mobile communication network, in particular designed in accordance with a GSM, UMTS or LTE standard, or in accordance with a Wi-Fi standard, and/or the method comprises the step g') ascertaining the data block from the measurement sequence in such a way that the data block has the continuous data transfer rate ≥10 kbit/s and the data transfer rate does not exceed <10 kbit/s during a period of time ≥2 seconds after the continuous data block. In accordance with this embodiment, a threshold value is 10 kbit/s, from which measured values of the measurement sequence are assigned to the data block. A threshold value of 10 kbit/s is then advantageous for example when data is exchanged between the terminal and the telecommunications network during running operation, but is not created by the user application.

In a particularly advantageous development, in step g) a plurality of data blocks are ascertained and step i) additionally comprises the application of a statistical method to the plurality of ascertained data blocks in order to ascertain the data transfer speed of the telecommunications network, in particular in order to obtain the percentiles P10, P50, P90 and/or average. By means of percentiles, also referred to as percentile ranks, the distribution of the obtained data transfer speed is broken down into 100 equal parts. Average values for example can be calculated in this way from a plurality of data blocks and enable a much more reliable determination of the data transfer speed of the telecommunications network.

As already mentioned, a physical limitation of the data transfer speed of the terminal can be given by the terminal type. In order to determine whether a limitation of this type is present, the method, in accordance with a preferred development and in addition to step d), also comprises the following steps performed by the analysis software: determining a percentile P99 of the measured values of the data block, in particular only for at least one downstream data block and/or one upstream data block, calling up a comparison transfer rate PMax of the determined terminal type from a database, and checking whether P99>0.95*PMax and P99≤PMax, in order to ascertain a limitation of the data transfer speed by the terminal type.

Experiments have shown that, as a result of the comparison as to whether P99>0.95*PMax and P99≤PMax, it can be reliably determined whether the ascertained data transfer speed for the terminal is limited by the terminal type or by the telecommunications network. The test result can thus reveal whether the ascertained data transfer speed of the telecommunications network is physically limited by the type of terminal or is a valid value. The percentile P99 is preferably ascertained for all measured values of the data block and/or for all data blocks. The comparison transfer rate PMax is preferably determined on the basis of the terminal type, in particular by means of steps d) and e). The ascertainment of the percentiles preferably comprises all measured values in particular of the data block or all data blocks and/or the user.

A further limitation of the data transfer speed can be provided by a tariff of the terminal. By way of example, the tariff in the case of a mobile communication network can provide a limitation to GPRS or UMTS data transfer speed, although the mobile communication network would allow LTE data transfer speed. In order to ascertain whether a limitation of this type is present, the method in accordance with a preferred development comprises the following steps performed by the analysis software: ascertaining a percentile P50 and P99 of the measured values of the data block, and checking whether 2*P50/P99>0.5 in order to ascertain a limitation of the data transfer speed by a tariff. Practical tests have shown that in this way it can be reliably determined whether there is a limitation of the data transfer speed on account of the tariff or whether the ascertained data transfer speed is a valid value. The ascertainment of the percentile P50 and P99 preferably comprises all measured values in particular of the data block or all data blocks and/or the user.

Yet a further limitation of the data transfer speed can be provided by the user application. By way of example, user applications exist which limit the data transfer to a maximum of 64 kbit/s. In order to ascertain whether a limitation of this type is present, the method in accordance with a preferred development comprises the following steps performed by the analysis software: checking whether, in a data block, a quotient of data volume in the primary transfer direction/data volume in the opposite direction is >5, and, if so, checking for a period of use of the user application whether the data block is ≥4 seconds and the quotient of data volume in the primary transfer direction/data volume in the opposite direction is >10, in order to ascertain a limitation of the data transfer speed by the user application. The primary transfer direction is preferably the downstream, wherein the primary transfer direction can also represent the upstream. The period of use of the user application preferably does not constitute a complete session, during which the user application transfers data. The period of use or session ends when the user application is changed or ended. In this way, it is ensured that no "conversational" session takes place, such as a Skype call. The test result can thus identify whether the ascertained data transfer speed of the telecommunications network is limited by the user application or is a valid value.

Lastly, the data transfer speed can also be provided by a volume limitation in particular of the tariff. With a volume limitation, for example in the case of a mobile communication tariff with an inclusive volume, the data transfer rate will be limited to a lower value when the inclusive volume has been exhausted. In order to determine whether a limitation of this type is present, the method in accordance with a preferred development comprises the following steps performed by the analysis software: ascertaining a maximum data transfer rate of the data block and checking whether the maximum data transfer rate was reached again within the last ≥36 hours, in order to ascertain a limitation of the data transfer rate as a result of a volume limitation. Practical tests have shown that, when the maximum data transfer rate has been reached beforehand, but then was no longer reached ≥36, 48 or 72 hours later, it can be concluded with sufficient certainty that the volume limitation has occurred. In this respect, a conclusion can be drawn on the basis of the test result as to whether the ascertained data transfer speed of the telecommunications network is influenced by a volume limitation or is a valid value.

In accordance with a further particularly preferred embodiment, a plurality of mobile terminals is provided, on each of which at least the steps a) to e) are performed. As a result of the plurality of terminals, a plurality of measurement sequences and therefore also a plurality of data blocks can be determined, such that a much more accurate ascertainment of the data transfer speed of the telecommunications network in the sense of a "crowd sourcing" is possible. In this respect, it is also preferred that the method comprises the further steps of ascertaining a particular telecommunications network provider by means of the terminals, and in step h) ascertaining the data transfer speed for the particular telecommunications provider. If, for example, various mobile communication networks of different providers exist, the data transfer speed can be determined for each individual provider.

The invention will be explained in greater detail hereinafter on the basis of a preferred embodiment with reference to the accompanying drawings, in which.

BRIEF DESCRIPTION OF THE DRAWINGS

DETAILED DESCRIPTION OF THE DRAWINGS

Figure 1:
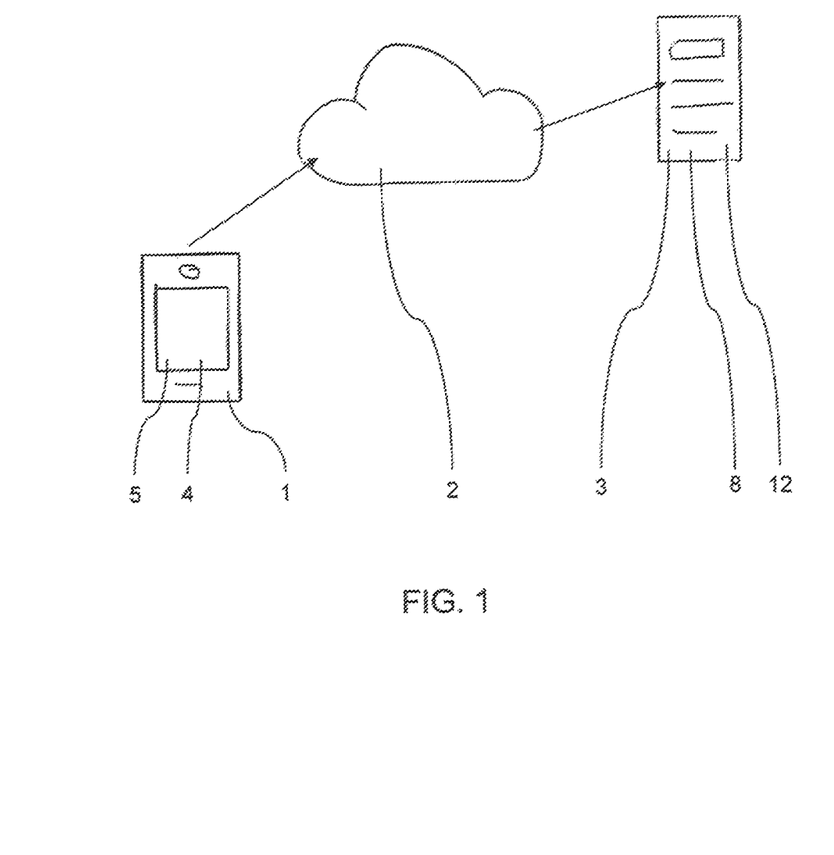
FIG. 1 shows a schematic view of a mobile terminal and a server for carrying out a method for determining a data transfer speed of a telecommunications network in accordance with a preferred exemplary embodiment of the invention.

FIG. 1 shows a schematic view of a mobile terminal 1 and a server 2 for carrying out a method for determining a data transfer speed of a telecommunications network 3 in accordance with a preferred exemplary embodiment of the invention. The mobile terminal 1 is embodied as a smartphone, on which, in step a), a measurement application 4 for carrying out steps c), d) and e) described hereinafter is installed and started. In step b) at least one user application 5 is installed and started on the terminal 1. The user application 5 can be embodied as a web browser, as a messaging program, as an email client, or the like, and can transfer data during operation between the terminal 1 and the telecommunications network 2.

The server 3 is arranged in a computer centre and is also connected to the telecommunications network 2. The telecommunications network 2 is embodied as a mobile communication network in accordance with a GSM, UMTS or LTE standard, such that data can be exchanged between the terminal 1 and the server 3 via TCP/IP. Alternatively, the telecommunications network 2 can be embodied in accordance with a Wi-Fi standard. Although not shown in FIG. 1, a plurality of terminals 1 are provided, on each of which the measurement application 4 and the user application 5 are installed and started, and which are each connected to the telecommunications network 2 and the server 3 for communication therewith. The terminals 1 are assigned to different users, who carry the terminals 1 with them and for example access the Internet via a user application 5.

Figure 2:
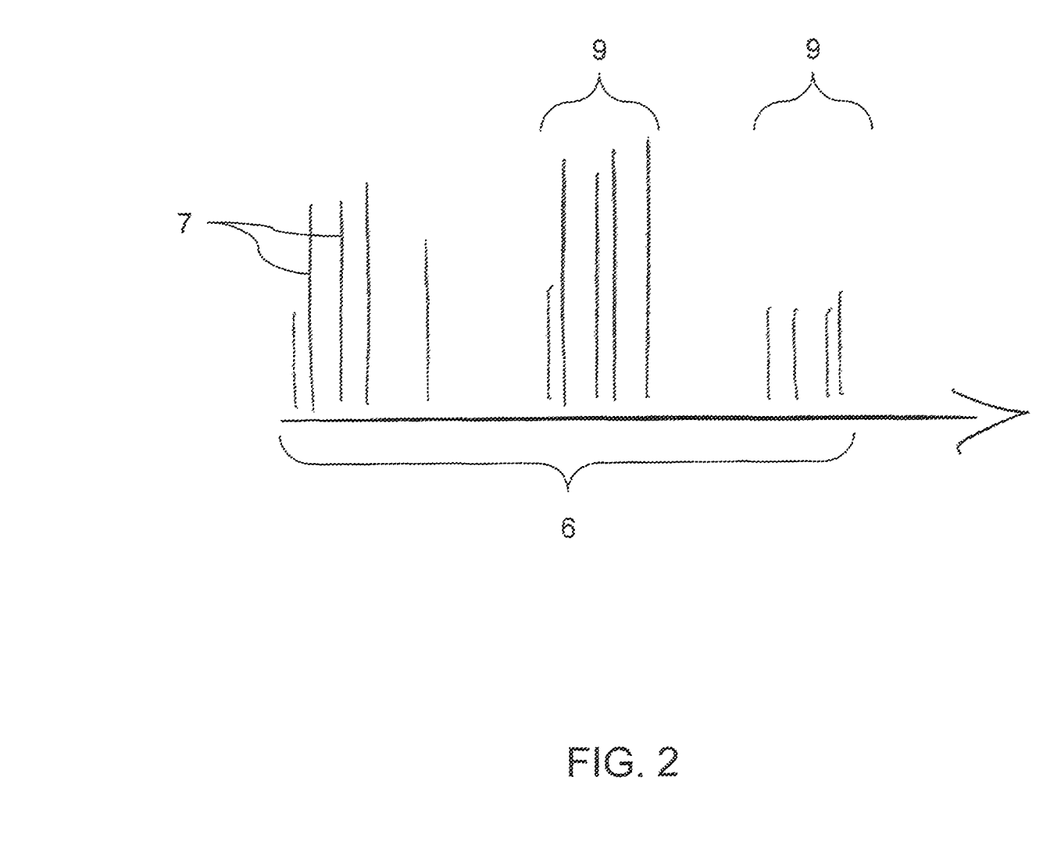
FIG. 2 shows a schematic view of a plurality of individual measured values of a course over time of a data transfer of the method according to FIG. 1 produced by a user application.

With reference to FIG. 2, a measurement sequence 6 comprising a plurality of individual measured values 7 of a course of time of a data transfer produced by the user application 5 is then ascertained in step c) by the measurement application 4 when data is transferred between the terminal 1 and telecommunications network 2. To this end, the course over time is plotted in FIG. 2 as x-axis and the measured values 7 ascertained every second are plotted as y-axis as data transfer in kbit/s. The data transfer is performed for example when the user accesses the Internet and watches an online video via the user application 5. Data is thus transferred from the telecommunications network 2 to the terminal 1.

As can be seen from FIG. 2 as a sequence over time of the data transfer, a break follows the first five measured values 7>0 kbit/s, which break is then followed by five further measured values 7>0 kbit/s, after which there is another break and then four further measured values 7>0 kbit/s. The measured values in the breaks have 0 kbit/s, since there is no data transfer. In step d) a terminal type is ascertained from the first eight numbers of the international mobile equipment identity serial number of the terminal 1 by means of the measurement application 4. The measurement sequence 7 ascertained previously in step c) and also the ascertained terminal type are transferred in step e) to the server 3 by means of the measurement application 4 via the telecommunications network 2.

Figure 3:
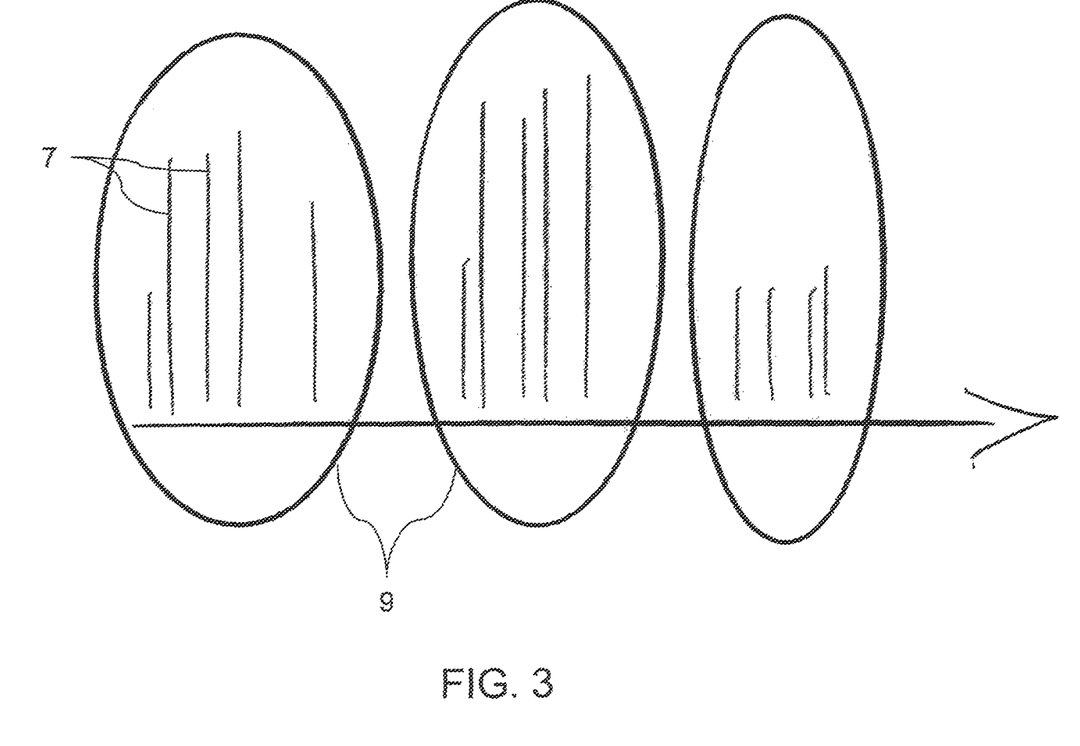
FIG. 3 shows a schematic view of the data blocks ascertained from the measured values according to FIG. 2
Figure 4:
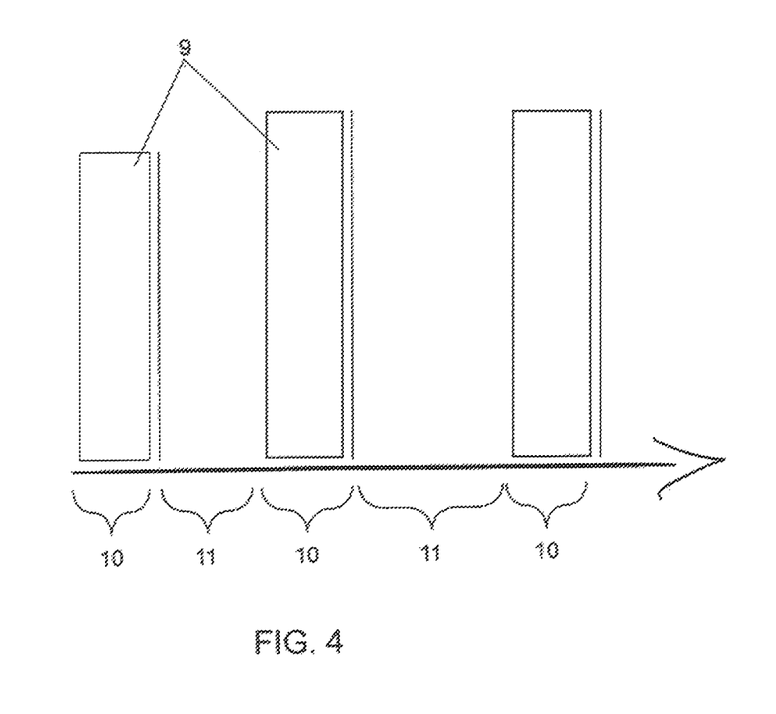
FIG. 4 shows a further schematic view of the data blocks from FIG. 3.

In step f) an analysis software 8 is installed and started on the server 3, by means of which the following steps g), h) and i) are performed. In step g) at least one data block 9 comprising at least one detected measured value 7 from the measurement sequence 6 is firstly ascertained by means of the analysis software 8 in such a way that the data block 9, as can be seen in FIG. 3 and FIG. 4, has a continuous data transfer rate 10>0 kbit/s, and a subsequent data transfer rate 11 lies below the continuous data transfer rate for a period of time ≥3 seconds after the data block 9.

This means that, after the continuous data transfer rate 10, in which data is transferred at a rate >0 kbit/s between the terminal 1 and the telecommunications network 2, a break ≥3 seconds follows, in which no data is transferred, as subsequent data transfer rate 11. If the continuous data transfer rate 10 is longer than 30 minutes, the analysis software 8 limits the data block 9 to 30 minutes. Referring back to FIG. 3, the first five measured values 7 in chronological sequence represent the first data block 9, which is followed by a first break. On the whole, the measurement sequence 9 illustrated in an exemplary manner in FIGS. 3 and 4 comprises three data blocks 9 identified by means of step g).

Lastly, in step i), the analysis software 8 determines, from the ascertained data blocks 9, the data transfer speed of the telecommunications network 2 from a period of time for the transfer of a defined data volume of 2 Mbytes and/or from a data volume to be transferred in the defined period of time of 4 seconds.

In an alternative embodiment, the data blocks 9 are divided into portions of defined length of 4 seconds in step h) by the analysis software 8, and in step i') the period of time for the transfer of a defined data volume and/or a data volume to be transferred in a defined period of time is determined from the first portion, i.e. from the first 4 seconds, of each data block by the analysis software as data transfer speed of the telecommunications network.

The specific data transfer speed can be limited on account of the terminal type, the tariff, the user application 5 and/or a volume limitation of the tariff, i.e. consequently does not constitute a representative value of the telecommunications network 2.

In order to ascertain a limitation of the data transfer speed by the terminal type, the percentile P99 of the measured values 7 of all data blocks 9 of the user of the terminal 1 is firstly determined by the analysis software 8, for example only for at least one downstream data block 9 and/or one upstream data block 9. After calling up a comparison transfer rate PMax of the determined terminal type from a database 12 provided on the server 3, it is checked whether P99>0.95*PMax and P99≤PMax. If so, there is no limitation of the data transfer speed on account of the terminal type.

The question as to whether the tariff is limiting the data transfer speed can be answered by ascertaining the percentiles P50 and P99 of the measured values 7 of all data blocks 9 of the user of the terminal 1, and also by subsequently checking whether 2*P50/P99>0.5. A limitation of the data transfer speed can be determined by the user application 5 by checking whether, in a data block 9, a quotient of data volume in the primary transfer direction/data volume in the opposite direction is >5, and, if so, by checking for a period of use of the user application 5 whether the data block 9 is ≥4 seconds and the quotient of data volume in the primary transfer direction/data volume in the opposite direction is >10. Lastly, by ascertaining a maximum data transfer rate of the data block 9 and subsequently checking whether the maximum data transfer rate was reached again within the last 36 hours, it is possible to determine whether there is a limitation of the data transfer speed on account of a volume limitation.

LIST OF REFERENCE SIGNS terminal 1
telecommunications network 2
server 3
measurement application 4
user application 5
measurement sequence 6
measured value 7
analysis software 8
data block 9
continuous data transfer rate 10
subsequent data transfer rate 11
database 12

The invention claimed is:

1. A method for determining a data transfer speed of a telecommunications network, comprising at least one mobile terminal and a server, said method having the following steps:
   a) installing and starting a measurement application on the terminal in order to carry out at least steps c) and e),
   b) installing and starting a user application on the terminal, which during operation transfers data between the terminal and the telecommunications network,
   c) ascertaining a measurement sequence comprising a plurality of individual measured values of a course over time of the data transfer produced by the user application,
   e) transferring the measurement sequence to the server by means of the terminal,
   f) installing and starting an analysis software on the server in order to carry out at least steps g) and i),
   g) ascertaining from the measurement sequence at least one data block comprising at least one detected measured value by the analysis software in such a way that the data block has a continuous data transfer rate >0 kbit/s and a subsequent data transfer rate lies below the continuous data transfer rate for a period of time ≥2 seconds after the data block, and
   i) ascertaining from the data block a period of time for the transfer of a defined data volume and/or a data volume to be transferred in a defined period of time as data transfer speed of the telecommunications network by means of the analysis software.

2. The method according claim 1, having the following steps:
   d) determining a terminal type by means of the measurement application from the first eight numbers of the international mobile equipment identity serial number of the terminal, and in step e) transferring the terminal type to the server by means of the terminal, and/or
   h) dividing the at least one data block into portions of defined length by means of the analysis software, and
   I') determining, from the portion, the period of time for the transfer of the defined data volume and/or the data volume to be transferred in the defined period of time as data transfer speed of the telecommunications network by means of the analysis software.

3. The method according claim 1, having the following step:
   h) dividing the at least one data block into portions of defined length of 5 second by means of the analysis software.

4. The method according to claim 1, wherein the measurement sequence is ascertained only when the user application on the terminal transfers data between the terminal and the telecommunications network.

5. The method according to claim 1, wherein the data block is ascertained by the analysis software in such a way that the subsequent data transfer rate lies below the continuous data transfer rate for a period of time ≥3 or ≥4 seconds after the data block, or there is no data transfer.

6. The method according to claim 1, wherein, in step c) when ascertaining the measurement sequence and/or with the ascertainment in step g), confirmation signals of the telecommunications network are 'ted.

7. The method according to claim 1, wherein a data block comprises no more than 30 minutes, the defined data volume comprises 2, 3 or 4 MB, and/or the defined period of time comprises 2, 3 or 4 seconds.

8. The method according to claim 1, wherein the terminal is embodied as a smartphone, as a mobile telephone, or as a tablet.

9. The method according to claim 1, wherein the telecommunications network is embodied as a mobile communication network according to a GSM, UMTS or LTE standard, or according to a Wi-Fi standard, said method having the step
   g') ascertaining the data block from the measurement sequence in such a way that the data block has the continuous data transfer rate ≥10 kbit/s and the subsequent data transfer rate is <10 kbit/s during a period of time ≥2 seconds after the continuous data transfer rate.

10. The method according to claim 1, wherein in step g) a plurality of data blocks are determined and step i) additionally comprises: applying a statistical method to the plurality of ascertained data blocks in order to determine the data transfer speed of the telecommunications network in order to obtain the percentiles P10, P50, P90 and/or average.

11. The method according to claim 10, comprising the following steps performed by the analysis software:

ascertaining a percentile P50 and P99 of the measured values of the data block, and checking whether 2*P50/P99>0.5 in order to ascertain a limitation of the data transfer speed by a tariff.

12. The method according to claim 10, comprising the following steps performed by the analysis software:

checking whether, in a data block, a quotient of data volume in the primary transfer direction/data volume in the opposite direction is >5, and, if so, checking for a period of use of the user application whether the data block is ≥4 seconds and the quotient of data volume in the primary transfer direction/data volume in the opposite direction is >10 in order to ascertain a limitation of the data transfer speed by the user application.

13. The method according to claim 10, comprising the following steps performed by the analysis software:

ascertaining a maximum data transfer rate of the data block, and checking whether the maximum data transfer rate has been reached again within the last ≥36 hours in order to ascertain a limitation of the data transfer speed as a result of a volume limitation.

14. The method according to claim 1, comprising the following steps performed by the analysis software:

d) determining a terminal type by means of the measurement application from the first eight numbers of the international mobile equipment identity serial number of the terminal, ascertaining a percentile P99 of the measured values of the data block, calling up a comparison transfer rate PMax of the determined terminal type from a database (21), and checking whether P99>0.95*PMax and P99≤PMax, in order to ascertain a limitation of the data transfer speed by the terminal type.

15. The method according to claim 14, comprising the following step performed by the analysis software:

ascertaining a percentile P99 of the measured values of the data block only for at least one downstream data block and/or one upstream data block.

16. The method according to claim 1, comprising a plurality of mobile terminals, on each of which at least the steps a) to e) are performed.

17. The method according to claim 16, comprising the following step:

ascertaining a particular telecommunications network provider by means of the terminals, and in step h) ascertaining the data transfer rate for the particular telecommunications network provider.

* * * * *